US007256569B2

(12) United States Patent
Wu et al.

(10) Patent No.: US 7,256,569 B2
(45) Date of Patent: Aug. 14, 2007

(54) APPARATUS AND METHOD FOR CONTINUOUS CONDUCTION MODE BOOST VOLTAGE POWER FACTOR CORRECTION WITH AN AVERAGE CURRENT CONTROL MODE

(75) Inventors: Chung-Cheng Wu, Tao Yuan (TW); Qin Huang, Apex, NC (US); Ning Zhu, Apex, NC (US); Xin Zhang, Apex, NC (US)

(73) Assignees: Niko Semiconductor Co., Ltd., Taipei (TW); Power Management Associates LLC, Apex, NC (US)

( * ) Notice: Subject to any disclaimer, the term of this patent is extended or adjusted under 35 U.S.C. 154(b) by 171 days.

(21) Appl. No.: 11/242,915

(22) Filed: Oct. 5, 2005

(65) Prior Publication Data

US 2007/0024251 A1 Feb. 1, 2007

(30) Foreign Application Priority Data

Aug. 1, 2005 (TW) .............................. 94126105 A

(51) Int. Cl.
*G05F 1/10* (2006.01)
*G05F 1/40* (2006.01)
*H02H 7/00* (2006.01)

(52) U.S. Cl. ...................................... 323/222; 323/282

(58) Field of Classification Search ................ 323/222, 323/223, 225, 268, 271, 282, 285; 363/50, 363/56.01
See application file for complete search history.

(56) References Cited

U.S. PATENT DOCUMENTS 5,461,303 A * 10/1995 Leman et al. ............... 323/222
6,191,564 B1 * 2/2001 Mao ........................... 323/222
6,222,746 B1 * 4/2001 Kim ............................ 363/89
6,531,854 B2 * 3/2003 Hwang ....................... 323/285
7,095,215 B2 * 8/2006 Liu et al. .................... 323/222
7,148,664 B2 * 12/2006 Takahashi et al. .......... 323/222
7,183,753 B2 * 2/2007 Tsuruya ...................... 323/222

* cited by examiner

*Primary Examiner*—Matthew V. Nguyen
(74) *Attorney, Agent, or Firm*—Rosenberg, Klein & Lee

(57) ABSTRACT

The continuous conduction mode (CCM) boost voltage power factor correction apparatus with an average-current control mode of the present invention uses resettable integrators to integrate the difference voltage signal outputted from the voltage error amplifier and the input current signal obtained from detection. The integration results are then compared to control the duty cycle of the switch. Thereby, the input current and the input voltage in the AC/DC electrical power converter have a proportion relation and their phases are the same as each other. The components used in this control method are simpler than the PFC circuit of the prior art. It is easy to integrate in one chip with fewer pins. The apparatus of the present invention has a high power factor and a low total harmonic distortion (THD).

20 Claims, 14 Drawing Sheets

APPARATUS AND METHOD FOR CONTINUOUS CONDUCTION MODE BOOST VOLTAGE POWER FACTOR CORRECTION WITH AN AVERAGE CURRENT CONTROL MODE

BACKGROUND OF THE INVENTION

1. Field of the Invention

The present invention relates to a continuous conduction mode (CCM) boost voltage power factor correction apparatus with an average current control mode. In particular, a power factor correction apparatus and a method utilizing a resettable integrator to achieve high power factor and low total harmonic distortion (THD) for an electrical power system.

2. Description of the Related Art

A high quality electrical power supply is a desired goal for every country in the world. However, building a lot of electrical power plants is not the only way to achieve the goal. For achieving the goal effectively, on the one hand a country can increase their electrical power supply, on the other hand they can also improve the power factor or the efficiency of electrical appliances.

A power factor correction (PFC) is used for making the input voltage of an electrical appliance in phase with the input current. Therefore, PFC makes the loading of the electrical appliance resistive to the electrical power system hence improving the energy efficiency.

PFC circuits are divided into discontinuous conduction mode power factor correction (DCM PFC) and continuous conduction mode power factor correction (CCM PFC). FIG. 1 shows the circuit diagram of the discontinuous conduction mode power factor correction with a peak current control mode of the prior art. The discontinuous conduction mode power factor correction (DCM PFC) 101 adopts a peak current control mode. When an alternating current (AC) is inputted, the peak current control mode rectifies the voltage into a voltage shape that is similar to an m-shaped via a bridge rectifier 10. The voltage is divided by two resistors R5 and R6. Next, the divided voltage is multiplied by an output signal $V_C$ that is amplified by an error amplifier via a multiplier 14 to obtain an output voltage Vm that is similar to m-shaped. The above circuit provides a reference voltage Vm for the peak current that flows through a detection resistor Rs. The reference voltage Vm is adjusted according to the input voltage and the output voltage.

The output voltage Vout is divided by the resistors R3 and R4 and is negatively fed back to the input port of the multiplier 14 via an error amplifier 12. By the above method, the output voltage Vout remains on a fixed level while the loading is changing. The output voltage Vm is connected to the positive input port of a comparator 16 and compared with a voltage Vs (the voltage drop produced by flowing the current of transistor Q through the detection resistor Rs) connected at the negative input port to control the transistor Q turn on). The discontinuous conduction mode power factor correction (DCM PFC) 101 utilizes a zero current crossing detector 13 to achieve the zero current for turn off of the transistor Q.

FIG. 2 shows a schematic diagram of waveforms of each point of the circuit of the FIG. 1. The waveform includes the voltage Vs between two ends of the detection resistor Rs, the inductor current $i_L$ on the inductor L, and a gate voltage Vgate for controlling whether the transistor Q is on or off. The phase of the average current $i_L$ that flows through the inductor L is the same as the phase of the output voltage Vm of the multiplier 14. Thereby, the power factor is amended. The major drawback of DCM PFC is its high THD due to large ripple current.

FIG. 3 shows a circuit diagram of the continuous conduction mode power factor correction with an average current control mode of the prior art. The shown continuous conduction mode power factor correction (CCM PFC) 1001 adopts an average current control mode. An alternating current (AC) is inputted and is rectified into an input voltage Vin that is similar to the m-shaped via a bridge rectifier 10. A multiplier 20 has an input signal A of the output voltage Vout via a voltage amplifier 24, an input signal B from the input voltage Vin via a preset circuit 22, and a square signal $C^2$ of the average value of the input voltage Vin. The multiplier 20 processes the multiplication operation between the amplified signal A and the input signal B and divides it by the square signal $C^2$ to obtain a current command signal $V_P$ that is similar to an m-shaped. The operation of dividing by the square signal $C^2$ prevents the power factor of the power factor correction from changing with the magnitude of the input signal B received from the input voltage Vin. The amplifying signal A is used for controlling the switch of the transistor Q via a control circuit to make the voltage stable even though the output voltage is changing.

FIG. 4 shows a schematic diagram of waveforms of each point of the circuit of the FIG. 3. The gate driving pulse $G_S$ is the result of comparing the triangle waveform $V_S$ and the command signal Vc. The duty cycle of the gate driving pulse $G_S$ is widest near the wave valley of the command signal Vc and is narrowest near the wave peak of the command signal Vc. In the FIG. 4, the current waveform $i_L$ of the inductor L is obtained by controlling the transistor Q via the gate driving pulse $G_S$. The current waveform $i_L$ flows through a capacitor Cin located at the input port and is filtered to obtain a current waveform $i_L$ (avg) that is similar to a sine wave. The current waveform $i_L$ (avg) that is similar to a sine wave has the same phase with the input voltage Vin. Thereby, the power factor is amended. The power factor correction having a multiplier needs a lot of components and its design is complex. It is difficult to design a single chip because of the large number of components and pin numbers needed for the chip.

SUMMARY OF THE INVENTION

The main object of the present invention is to provide a simpler and superior CCM boost voltage power factor correction apparatus with a current-averaging control mode. The apparatus is used for an AC/DC electrical power converter. The apparatus uses a duty signal outputted from an oscillator to control a switch to trim the input current of the AC/DC electrical power converter and make the input current have a sine waveform with a phase that is the same as the input voltage. The present invention utilizes resettable integrators to obtain integration operation for the output voltage signal of a voltage error amplifier and the sensed input current signal. The integrated signal is then compared to control the duty cycle of the switch. This method makes the input port of the AC/DC electrical power converter resistive hence achieving high power factor. Thereby, the input current and the input voltage have a proportion relation and the phase is the same as each other.

The first embodiment of the CCM boost voltage power factor correction apparatus with a current-averaging control mode of the present invention uses a voltage error amplifier to obtain a voltage feedback signal. The voltage feedback signal is compared with a reference voltage to output a difference voltage signal. A first resettable integrator connects with the voltage error amplifier for integrating the difference voltage signal to output a first output signal. A second resettable integrator obtains an amplified input current signal via a detection resistor and an amplifier and integrates the amplified input current signal to output a second output signal. A comparator compares the first output signal with the second output signal to output a power factor amended signal. A reset port of a flipflop connects with the oscillator and a set port of the flipflop connects with the comparator via a PFC output controller for receiving a PFC setting signal outputted from the PFC output controller. The flipflop outputs a control signal to control the switch in time according to an output cycle signal outputted from the oscillator. An integrator status control unit connects with the oscillator, the flipflop, the first resettable integrator and the second resettable integrator for receiving the control signal to individually output a first reset signal and a second reset signal to the first resettable integrator and the second resettable integrator. The integrator status control unit resets the first output signal and the second output signal by using a leading edge method.

The second embodiment of the CCM boost voltage power factor correction apparatus with a current-averaging control mode of the present invention further comprises an adder. The adder connects with the first resettable integrator and the second resettable integrator for adding the first output signal and the second output signal to output an integrated signal. Then, a comparator compares the difference voltage signal outputted from the voltage error amplifier with the integrated signal to output a power factor amended signal. The integrator status control unit resets the first output signal and the second output signal by using a trailing edge method.

The third embodiment of the CCM boost voltage power factor correction apparatus with a current-averaging control mode of the present invention uses a voltage error amplifier to obtain a voltage feedback signal. The voltage feedback signal is compared with a reference voltage to output a difference voltage signal. An integrator integrates the difference voltage signal to output an integration output signal. A comparator receives the integration output signal and obtains an amplified input current signal via a detection resistor and an amplifier. The comparator compares the integration output signal with the amplified input current signal to output a power factor amended signal. A capacitor connects with the detection resistor in parallel. A reset port of a flipflop connects with the oscillator and a set port of the flipflop connects with the comparator via a PFC output controller for receiving a PFC setting signal outputted from the PFC output controller. The flipflop outputs a control signal to control the switch in time according to an output cycle signal outputted from the oscillator. The integrator status control unit resets the integration output signal by using a leading edge method.

The fourth embodiment of the CCM boost voltage power factor correction apparatus with a current-averaging control mode of the present invention further comprises an adder. The adder connects with the voltage error amplifier and the comparator for adding the difference voltage signal and the input current signal to output an integrated signal via the detection resistor and the amplifier to obtain an amplified input current signal. Then, a comparator connects with the integrator and the adder for comparing the integration output signal with the integrated signal to output a power factor amended signal. A set port of a flipflop connects with the oscillator and a reset port of the flipflop connects with the comparator via a PFC output controller for receiving a PFC resetting signal outputted from the PFC output controller. The flipflop outputs a control signal to control the switch in time according to an output cycle signal outputted from the oscillator. The integrator status control unit resets the integration output signal by using a trailing edge method.

The CCM boost voltage power factor correction apparatus with a current-averaging control mode of the present invention is used for an AC/DC electrical power converter. The apparatus uses integrators to integrate the difference voltage signal obtained from comparison and the input current signal obtained from detection. Next, the integration result is compared to control the duty cycle of the switch. Thereby, the input current and the input voltage in the AC/DC electrical power converter have a proportion relation and their phases are the same as each other. The components used in this control method are simpler than the PFC circuit of the prior art. It is easy to integrate in one chip with fewer pins. The apparatus of the present invention has a high power factor and a low total harmonic distortion (THD).

For further understanding of the invention, reference is made to the following detailed description illustrating the embodiments and examples of the invention. The description is only for illustrating the invention and is not intended to be considered limiting the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
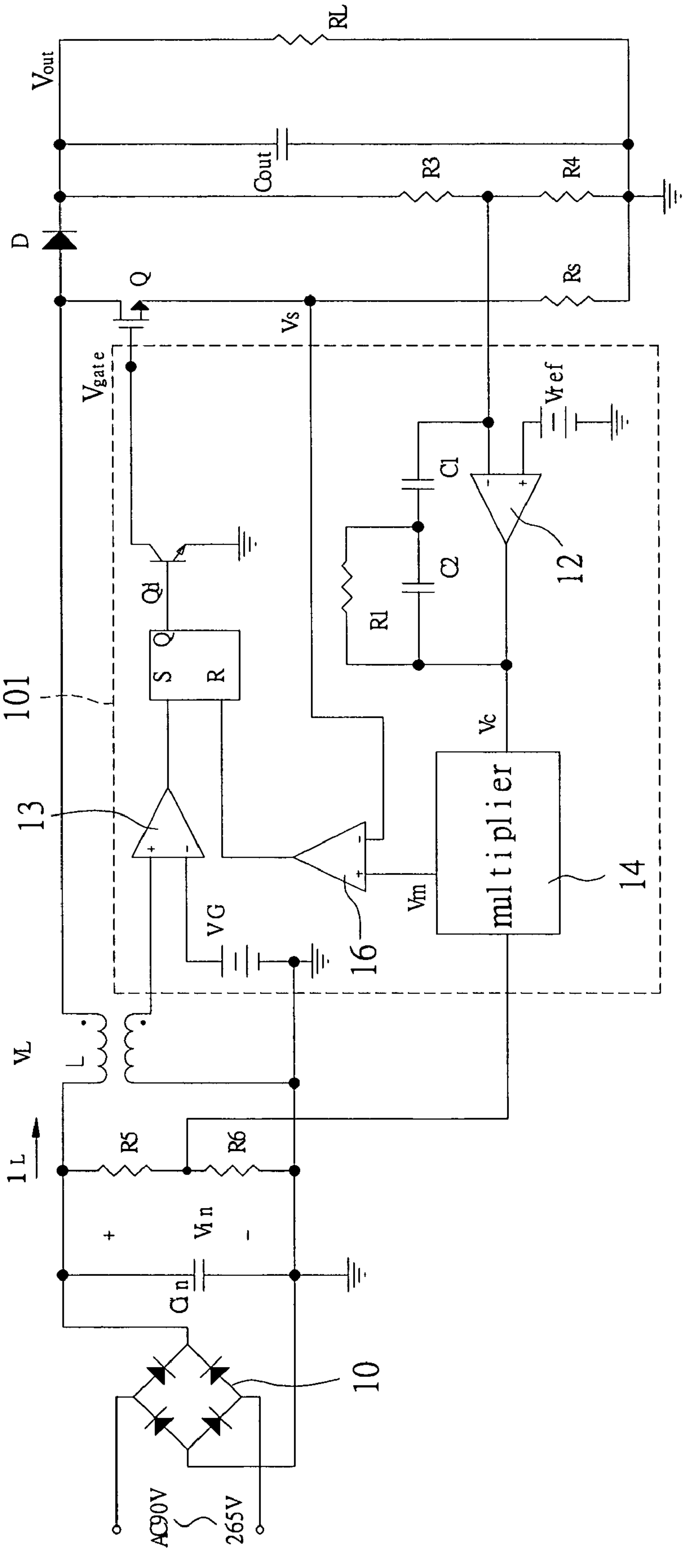
FIG 1 PRIOR ART
FIG. 1 is a circuit diagram of the discontinuous conduction mode power factor correction with a peak current control mode of the prior art.
Figure 2:
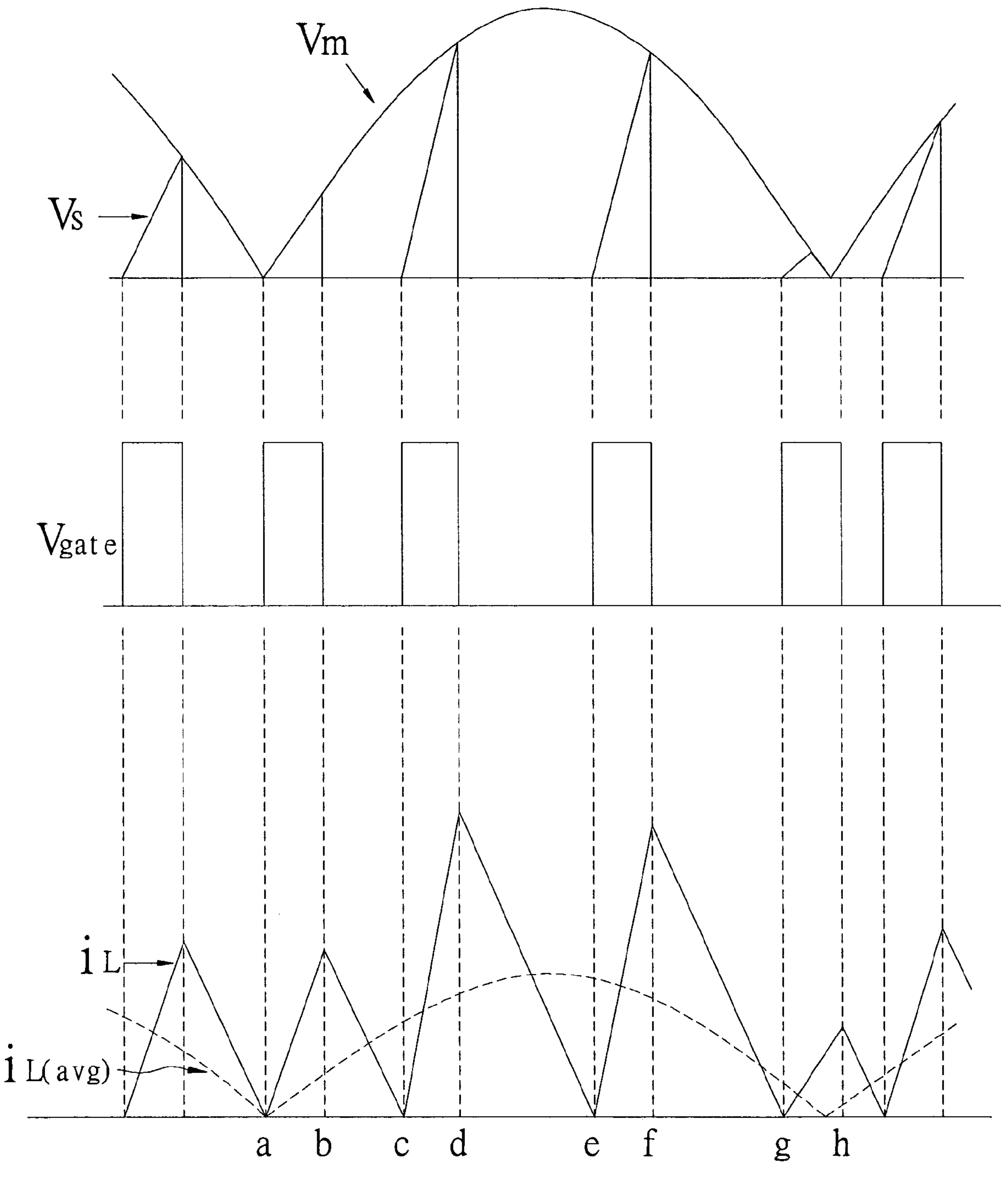
FIG 2 PRIOR ART
FIG. 2 is a schematic diagram of waveforms of each point of the circuit in FIG. 1.
Figure 3:
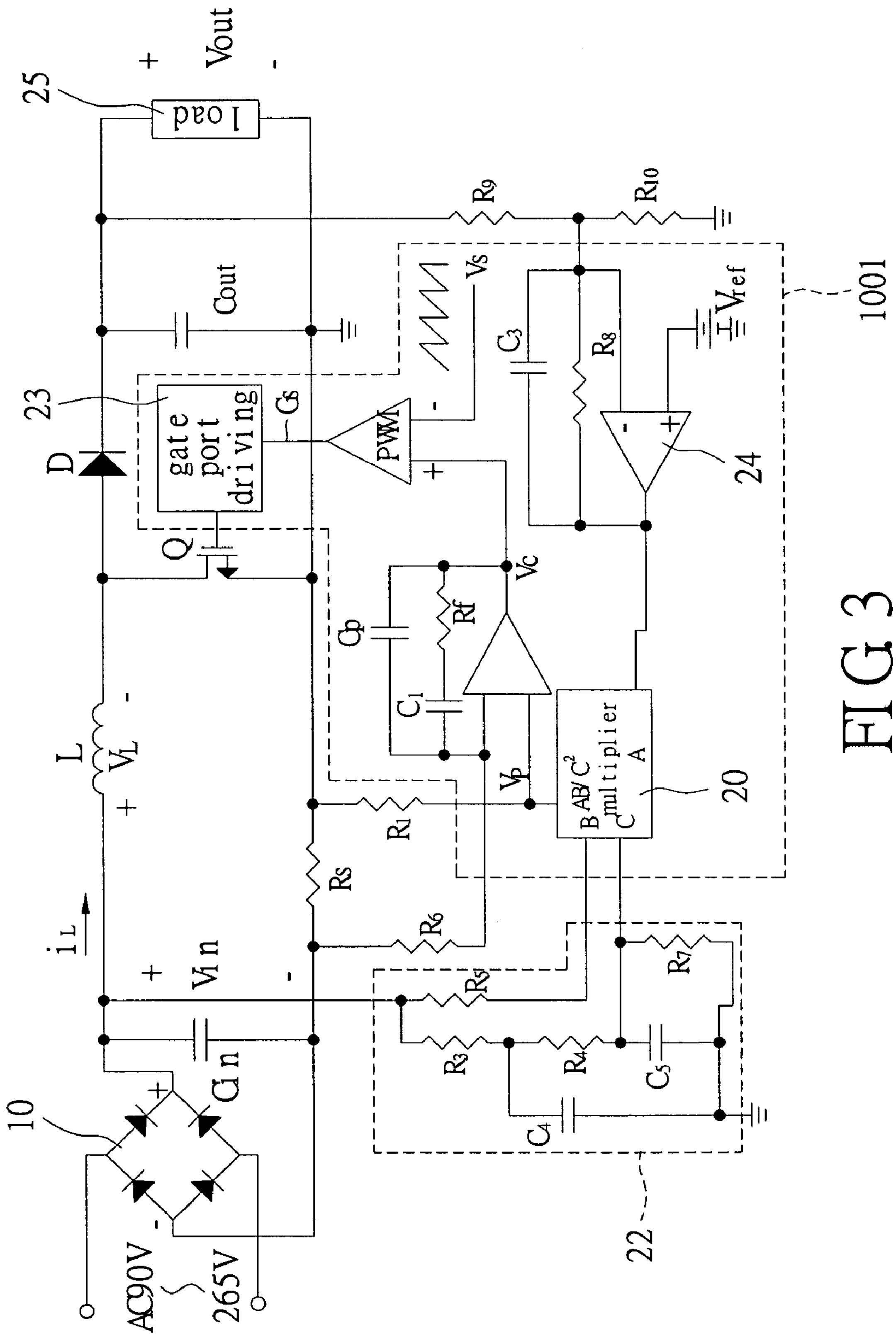
FIG 3 PRIOR ART
FIG. 3 is a the circuit diagram of the continuous conduction mode power factor correction with an average current control mode of the prior art.
Figure 4:
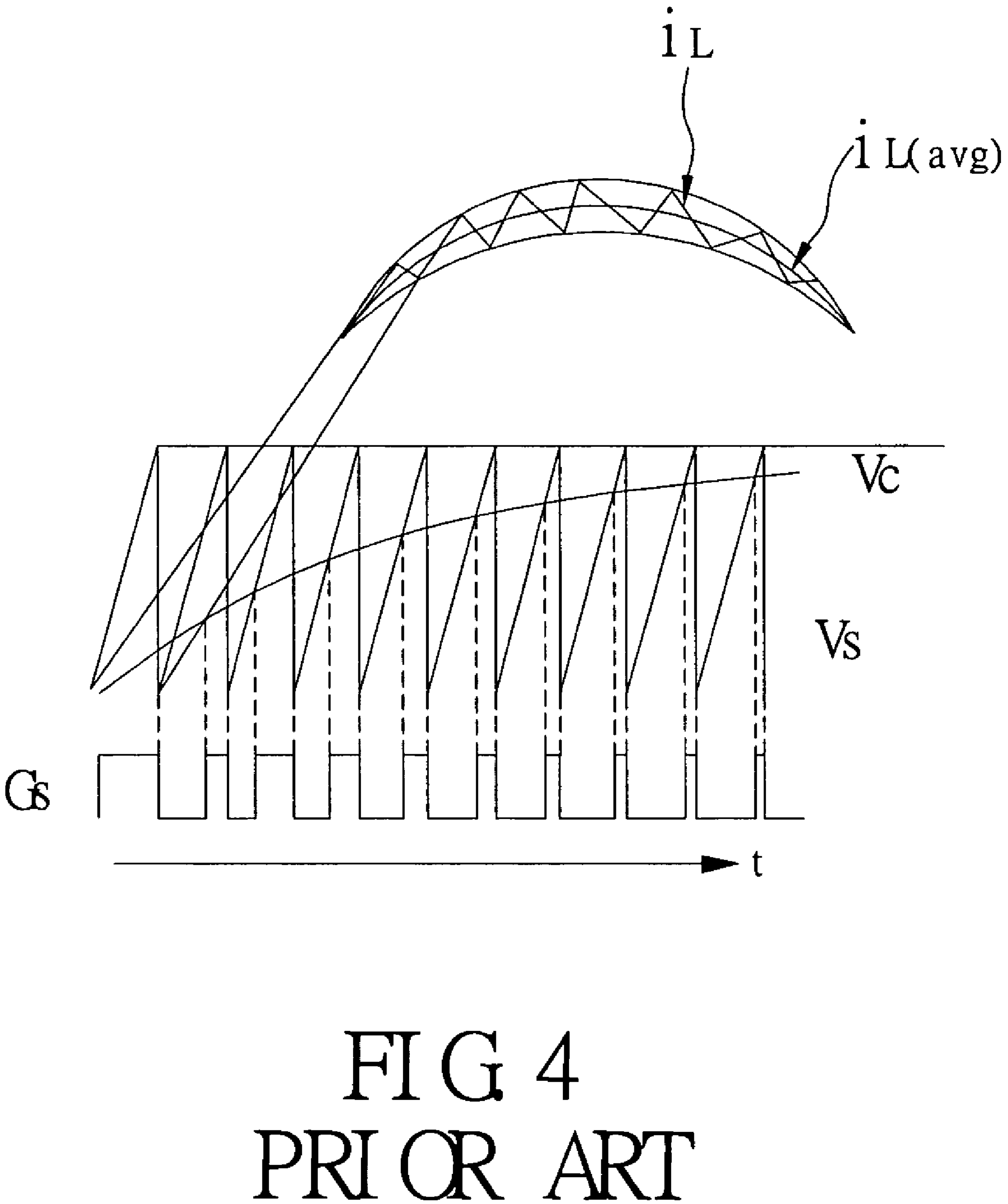
FIG. 4 PRIOR ART
FIG. 4 is a schematic diagram of waveforms of each point of the circuit in FIG. 3.
Figure 5:
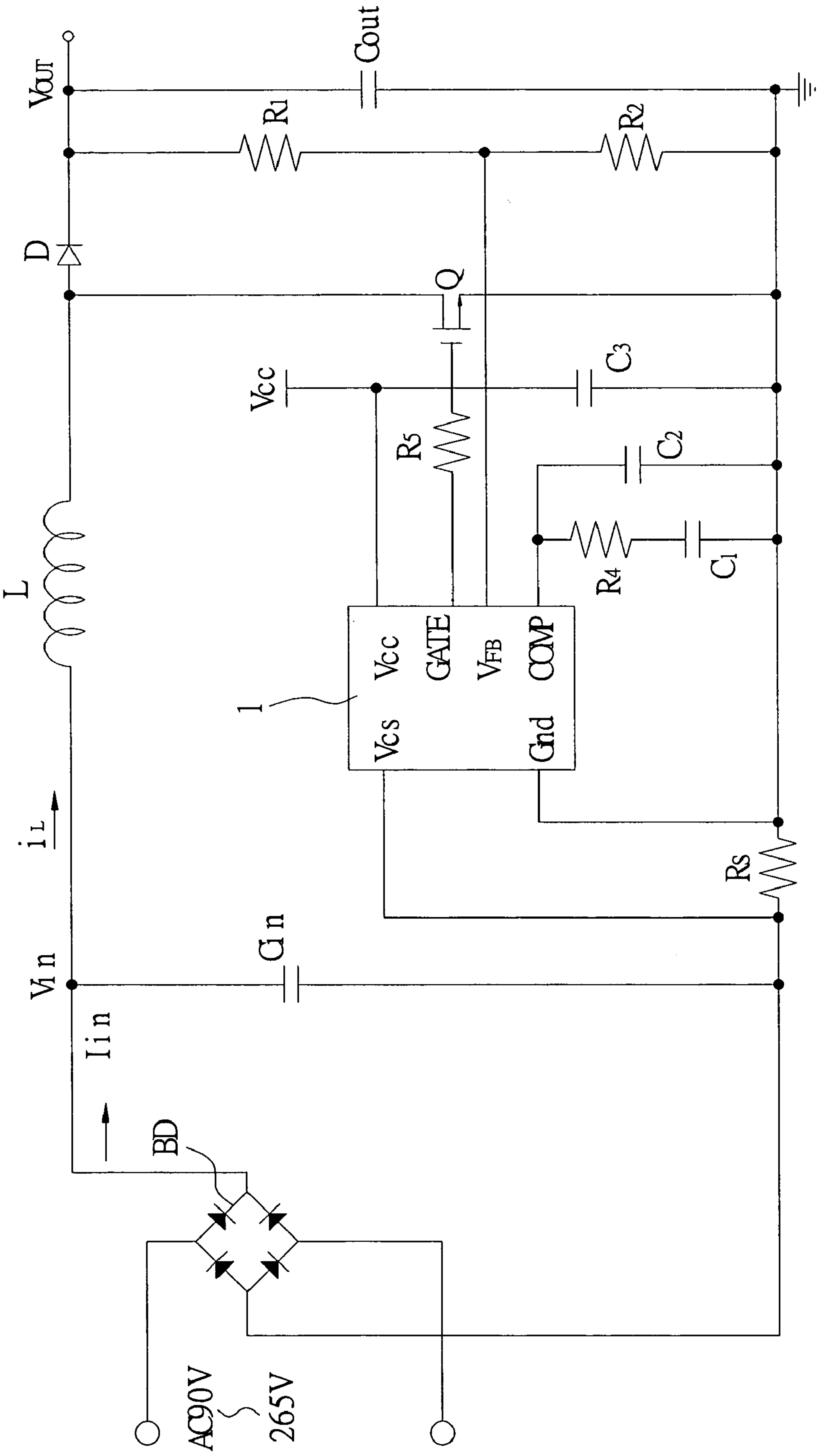
FIG. 5 is a structure diagram of the present invention used in an AC/DC electrical power converter of the first embodiment.

FIG. 5 shows a structure diagram of the present invention used in an AC/DC electrical power converter of the first embodiment. The CCM boost voltage power factor correction apparatus 1 with a current-averaging control mode of the present invention controls the duty switch operation of a switch Q and makes the input current Iin follow the input voltage Vin rectified by a rectification element BD. Therefore, the input current Iin and the input voltage Vin in the AC/DC electrical power converter have a proportion relation and their phases are the same as each other. The apparatus of the present invention has a high power factor and a low total harmonic distortion (THD).

Figure 6:
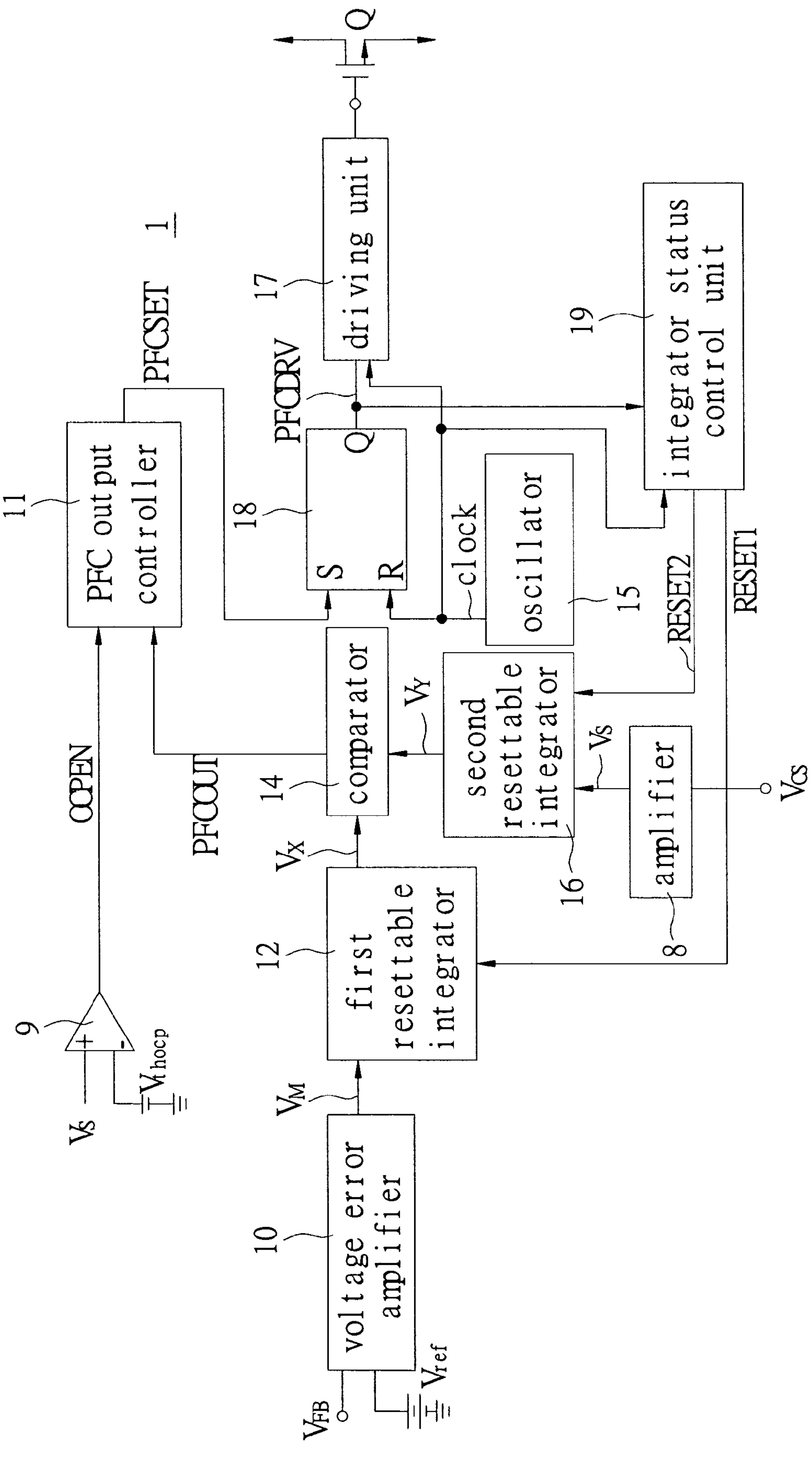
FIG. 6 is a circuit block diagram of the first embodiment of the present invention.

FIG. 6 shows a circuit block diagram of the first embodiment of the present invention. Please refer to FIGS. 5 and 6. The CCM boost voltage power factor correction apparatus 1 with a current-averaging control mode of the present invention is used for an AC/DC electrical power converter. The CCM boost voltage power factor correction apparatus 1 with a current-averaging control mode uses a cycle signal clock outputted from a oscillator 15 to control a switch Q to trim the input current Iin of the AC/DC electrical power converter and make the input current Iin have a sine waveform and its phase be the same as the input voltage Vin. The power factor correction apparatus 1 uses a voltage error amplifier 10 connected with the output port of the AC/DC electrical power converter to obtain a voltage feedback signal $V_{FB}$ via a dividing resistor R2. The voltage error amplifier 10 compares the voltage feedback signal $V_{FB}$ with a reference voltage Vref to output a difference voltage signal $V_M$.

A first resettable integrator 12 connects with the voltage error amplifier 10 for integrating the difference voltage signal $V_M$ to output a first output signal $V_X$. The slope of the first output signal $V_X$ is determined by the magnitude of the difference voltage signal $V_M$. A second resettable integrator 16 obtains an amplified input current signal Vs via a detection resistor $R_S$ and an amplifier and integrates the amplified input current signal Vs to output a second output signal $V_Y$. The slope of the second output signal $V_Y$ is determined by the magnitude of the amplified input current signal Vs. A comparator 14 that connects with the first resettable integrator 12 and the second resettable integrator 16 compares the first output signal $V_X$ with the second output signal $V_Y$ to output a power factor amended signal PFCOUT.

The power factor amended signal PFCOUT is transmitted to a PFC output controller 11 that is connected with the comparator 14. The PFC output controller 11 outputs a PFC setting signal PFCSET to a set port S of a flipflop 18. The period of the PFC setting signal PFCSET is about several 10 ns and the PFC setting signal PFCSET is used for setting the flipflop 18 to output a control signal PFCDRV and control the switch Q in time. The apparatus 1 (FIG. 5) further includes a driving unit 17 that is connected with the flipflop 18 and the switch Q for amplifying the control signal PFCDRV to drive the switch Q. An integrator status control unit 19 connects with the oscillator 15, the flipflop 18, the first resettable integrator 12 and the second resettable integrator 16. The integrator status control unit 19 is controlled by the control signal PFCDRV to output a first reset signal RESET1 to the first resettable integrator 12 and a second reset signal RESET2 to the second resettable integrator 16. The period of the second reset signal RESET2 is about several 10 ns.

In the CCM boost voltage power factor correction apparatus 1 with a current-averaging control mode of the present invention, the first output signal $V_X$ of the first resettable integrator 12 is the variation average value of the voltage feedback signal $V_{FB}$ and the reference voltage Vref. The second output signal $V_Y$ of the second resettable integrator 16 is the variation average value of the input current signal $V_{CS}$. When the first output signal $V_X$ is larger than the second output signal $V_Y$, the power factor amended signal PFCOUT outputted from the comparator 14 sets the control signal PFCDRV outputted from the flipflop 18 to make the switch Q turn on. By using this control method, the input port of the AC/DC electrical power converter has resistance. Thereby, the input current Iin is a sine wave, and the input current Iin and the input voltage Vin have a proportion relation and their phases are the same as each other.

Moreover, the CCM boost voltage power factor correction apparatus 1 with a current-averaging control mode of the present invention adopts a one-cycle control (OCC) method according to the output cycle signal clock of the oscillator 15. When the control signal PFCDRV outputted from the flipflop 18 is set, the integrator status control unit 19 individually outputs the first reset signal RESET1 and the second reset signal RESET2 to the first resettable integrator 12 and the second resettable integrator 16 for resetting the first output signal $V_X$ and the second output signal $V_Y$. Thereby, the first resettable integrator 12 and the second resettable integrator 16 boost the voltage under an average current control mode and continuously amend the power factor in a one-cycle control (OCC).

Figure 7:
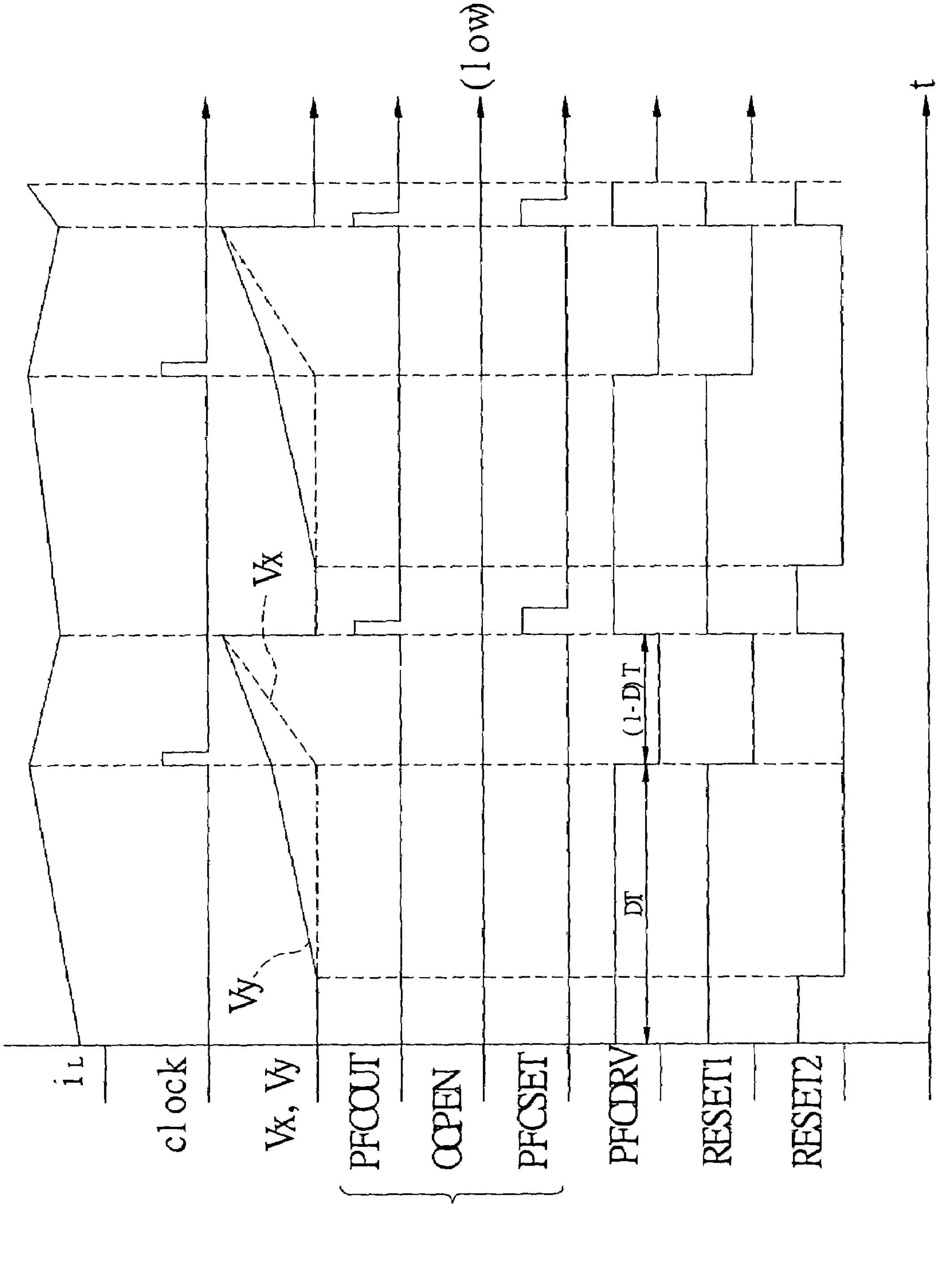
FIG. 7 is a schematic diagram of waveforms of the circuit of the first embodiment of the present invention in FIG. 6.

Please refer to FIGS. 6 and 7. FIG. 7 shows a schematic diagram of waveforms of the circuit of the first embodiment of the present invention. The control signal PFCDRV outputted from the flipflop 18 is controlled by the result of the comparator 14. When the first output signal $V_X$ is larger than the second output signal $V_Y$, the power factor amended signal PFCOUT outputted from the comparator 14 sets the control signal PFCDRV outputted from the flipflop 18 via the PFC output controller 11 to make the switch Q turn on. Until the oscillator 15 outputs a next cycle clock, the switch Q turns off again to form a leading edge. At the same time, the integrator status control unit 19 individually outputs the first reset signal RESET1 and the second reset signal RESET2 to the first resettable integrator 12 and the second resettable integrator 16 for resetting the first output signal $V_X$ and the second output signal $V_Y$. By using this control method, the current $i_L$ flowing through the inductor L is in continuous conduction mode. Thereby, the input port of the AC/DC electrical power converter has a resistance. So, the input current Iin is a sine wave, and the input current Iin and the input voltage Vin have a proportion relation and their phases are the same as each other.

That the input current Iin and the input voltage Vin have a proportion relation and the same phases as each other can be proved by the following $$V_Y = V_X$$

$$\frac{1}{\tau}\int_0^T iRG\,dt = \frac{1}{\tau}\int_0^{(1-D)T} V_M\,dt$$

$$\frac{T}{\tau} i_{av} R_s G = \frac{T}{\tau} V_M (1 - D)$$

$$\text{let } \tau \cong T$$

-continued $$i_{av}R_SG = V_M(1-D) = V_M\frac{V_{in}}{V_O}$$

$$i_{av} \propto V_{in}$$

In the formulas (1), Vin is the input voltage; Vo is the output voltage; $i_{av}$ is the average input current; T is the cycle; $V_M$ is the difference voltage signal; D is the duty cycle; Rs is the detection resistor; G is the current sensor gain; τ is the time constant of the integrator.

Figure 8:
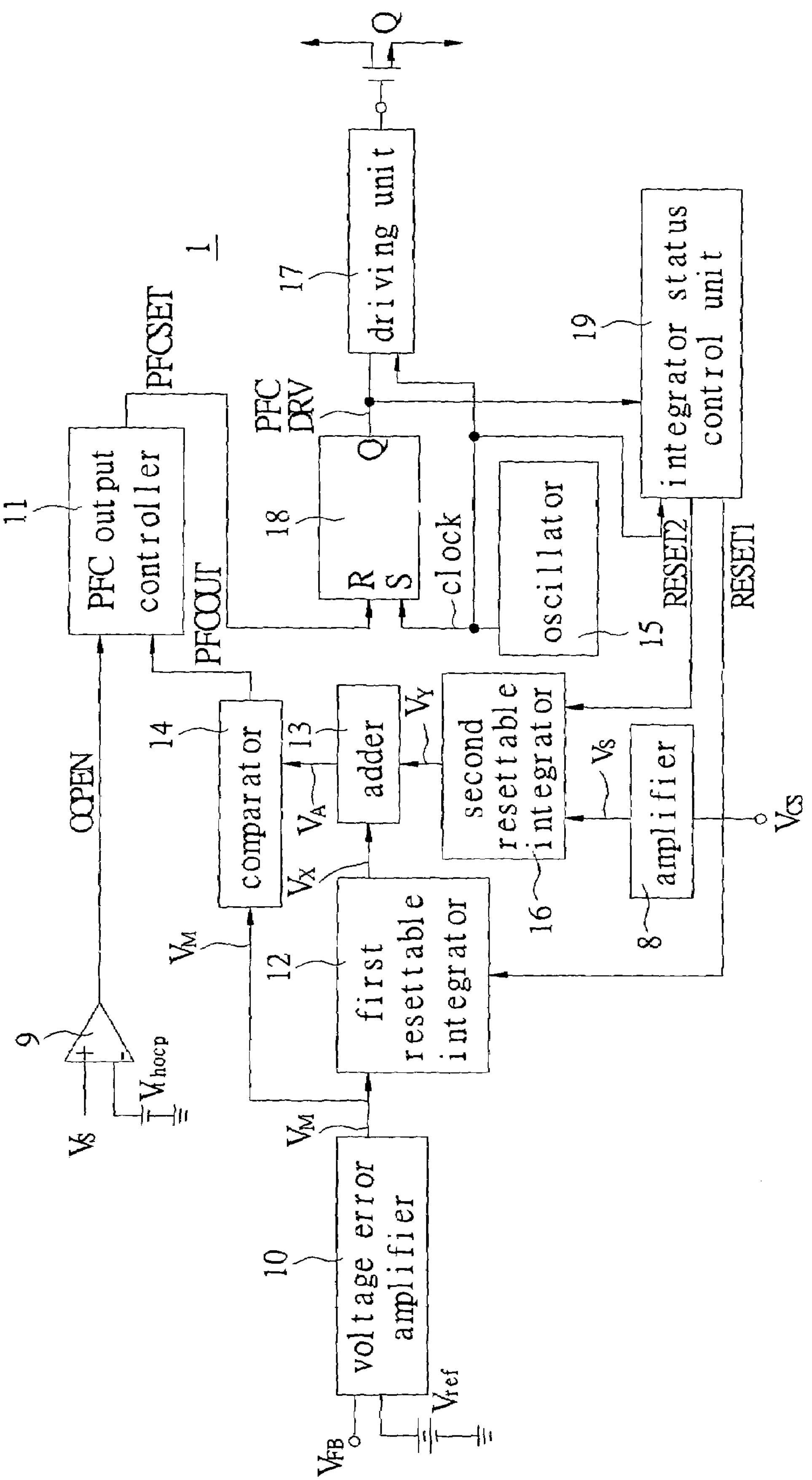
FIG. 8 is a circuit block diagram of the second embodiment of the present invention.

Please refer to FIGS. 5 and 8. FIG. 8 shows a circuit block diagram of the second embodiment of the present invention. The continuous boost voltage power factor correction apparatus 1 with the current-averaging control mode of the present invention is used for an AC/DC electrical power converter. The continuous boost voltage power factor correction apparatus 1 with a current-averaging control mode uses a cycle signal clock outputted from a oscillator 15 to control a switch Q to trim the input current Iin of the AC/DC electrical power converter and make the input current Iin have a sine waveform and a phase that is the same as the input voltage Vin.

The second embodiment of the CCM boost voltage power factor correction apparatus 1 with a current-averaging control mode of the present invention further comprises an adder 13. The adder 13 connects with the first resettable integrator 12 and the second resettable integrator 16 for adding the first output signal $V_X$ and the second output signal $V_Y$ to output an integrated signal $V_A$. Next, the integrated signal $V_A$ is transmitted to the comparator 14. The comparator 14 connects with the adder 13 and the voltage error amplifier 10. The comparator 14 compares the difference voltage signal $V_M$ with the integrated signal $V_A$ to output a power factor amended signal PFCOUT.

The power factor amended signal PFCOUT is transmitted to a PFC output controller 11 that is connected with the comparator 14. The PFC output controller 11 outputs a PFC resetting signal PFCRESET to a reset port R of a flipflop 18. The period of the PFC resetting signal PFCRESET is about several 10 ns and the PFC resetting signal PFCRESET is used for resetting the control signal PFCDRV output from the flipflop 18 to control the switch Q so that it turns off in time. The driving unit 17 connects with the flipflop 18 and the switch Q for amplifying the control signal PFCDRV to drive the switch Q. The integrator status control unit 19 is controlled by the control signal PFCDRV to output a first reset signal RESET1 to the first resettable integrator 12 and a second reset signal RESET2 to the second resettable integrator 16. The period of the second reset signal RESET2 is about several 10 ns.

In the CCM boost voltage power factor correction apparatus 1 with a current-averaging control mode of the present invention, the first output signal $V_X$ of the first resettable integrator 12 is the variation average value of the voltage feedback signal $V_{FB}$ and the reference voltage Vref. The second output signal $V_Y$ of the second resettable integrator 16 is the variation average value of the input current signal $V_{CS}$. When the integrated signal $V_A$ is larger than the difference voltage $V_M$, the power factor amended signal PFCOUT outputted from the comparator 14 resets the control signal PFCDRV outputted from the flipflop 18 to make the switch Q turn off. By using this control method, the input port of the AC/DC electrical power converter has a resistance. Thereby, the input current Iin is a sine wave, and the input current Iin and the input voltage Vin have a proportion relation and their phases are the same as each other.

Moreover, the CCM boost voltage power factor correction apparatus 1 with a current-averaging control mode of the present invention adopts a one-cycle control (OCC) method according to the output cycle signal clock of the oscillator 15. When the control signal PFCDRV outputted from the flipflop 18 is reset, the integrator status control unit 19 individually outputs the first reset signal RESET1 and the second reset signal RESET2 to the first resettable integrator 12 and the second resettable integrator 16 for resetting the first output signal $V_X$ and the second output signal $V_Y$. Thereby, the first resettable integrator 12 and the second resettable integrator 16 boost the voltage under an average current control mode and continuously amend the power factor in a one-cycle control (OCC).

Figure 9:
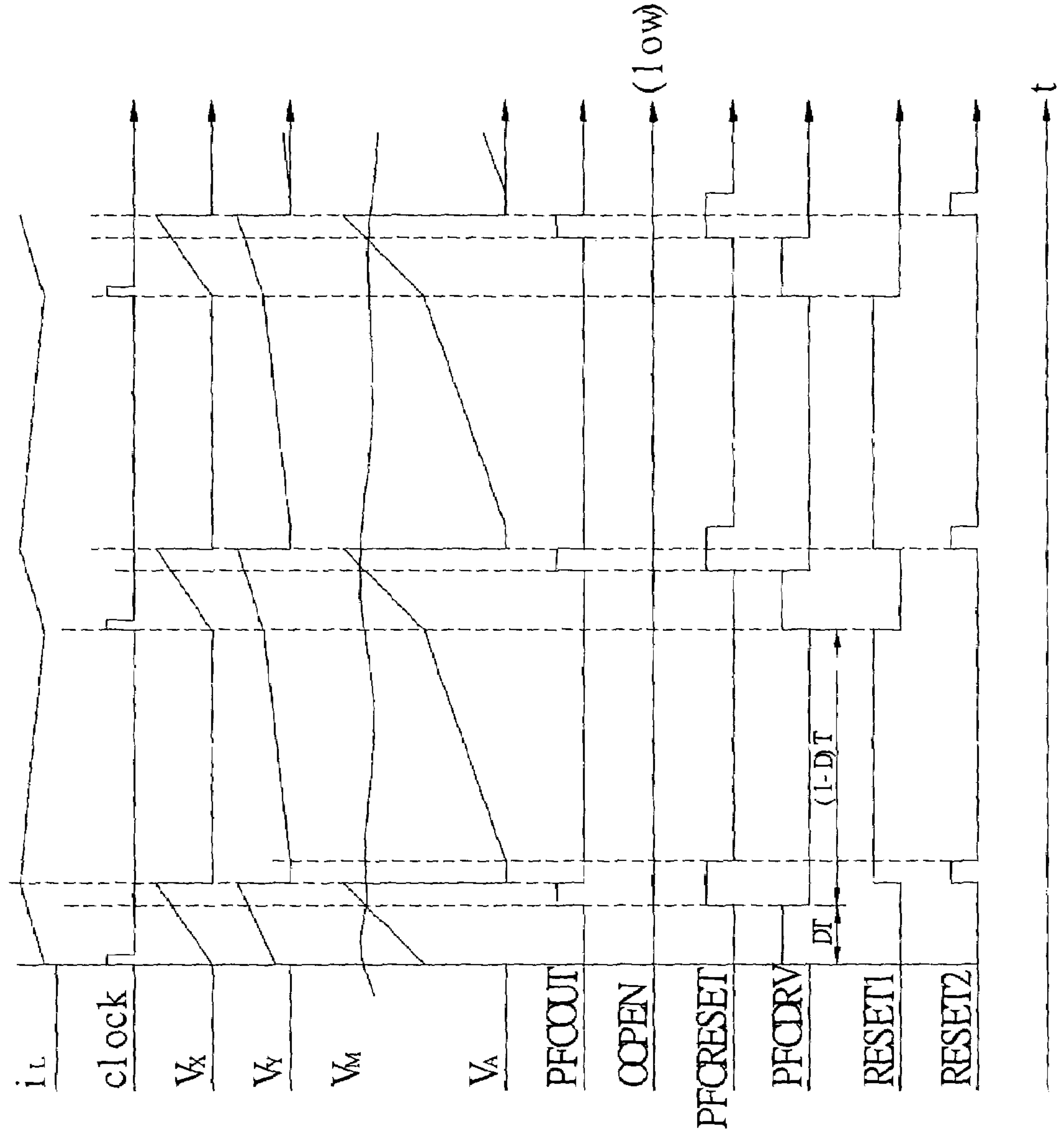
FIG. 9 is a schematic diagram of waveforms of the circuit of the second embodiment of the present invention in FIG. 8.

FIG. 9 shows a schematic diagram of waveforms of the circuit of the second embodiment of the present invention. The control signal PFCDRV outputted from the flipflop 18 is controlled by the result of the comparator 14. When the integrated signal $V_A$ is larger than the difference voltage $V_M$, the power factor amended signal PFCOUT outputted from the comparator 14 resets the control signal PFCDRV outputted from the flipflop 18 via the PFC output controller 11 to make the switch Q turn off. Until the oscillator 15 outputs a next cycle clock, the switch Q turns on again to form a trailing edge. At the same time, the integrator status control unit 19 individually outputs the first reset signal RESET1 and the second reset signal RESET2 to the first resettable integrator 12 and the second resettable integrator 16 for resetting the first output signal $V_X$ and the second output signal $V_Y$. By using this control method, the current $i_L$ flowing through the inductor L is in continuous conduction mode. Thereby, the input port of the AC/DC electrical power converter has a resistance. In this way, the input current Iin is a sine wave, and the input current Iin and the input voltage Vin have a proportion relation and their phases are the same as each other.

That the input current Iin and the input voltage Vin have a proportion relation and their phases are the same as each other can be proved by the following formulas (2):

$$V_M = V_X + V_Y$$

$$V_M = \frac{1}{\tau}\int_0^{DT} V_M\,dt + \frac{1}{\tau}\int_0^T iRG\,dt$$

$$V_M = \frac{T}{\tau}V_M D + \frac{T}{\tau}i_{av}R_sG$$

$$\text{let } \tau \cong T$$

$$i_{av}R_SG = V_M(1-D) = V_M\frac{V_{in}}{V_O}$$

$$i_{av} \propto V_{in}$$

In the formulas (2), Vin is the input voltage; Vo is the output voltage; $i_{av}$ is the average input current; T is the cycle; $V_M$ is the difference voltage signal; D is the duty cycle; Rs is the detection resistor; G is the current sensor gain; τ is the time constant of the integrator.

Figure 10:
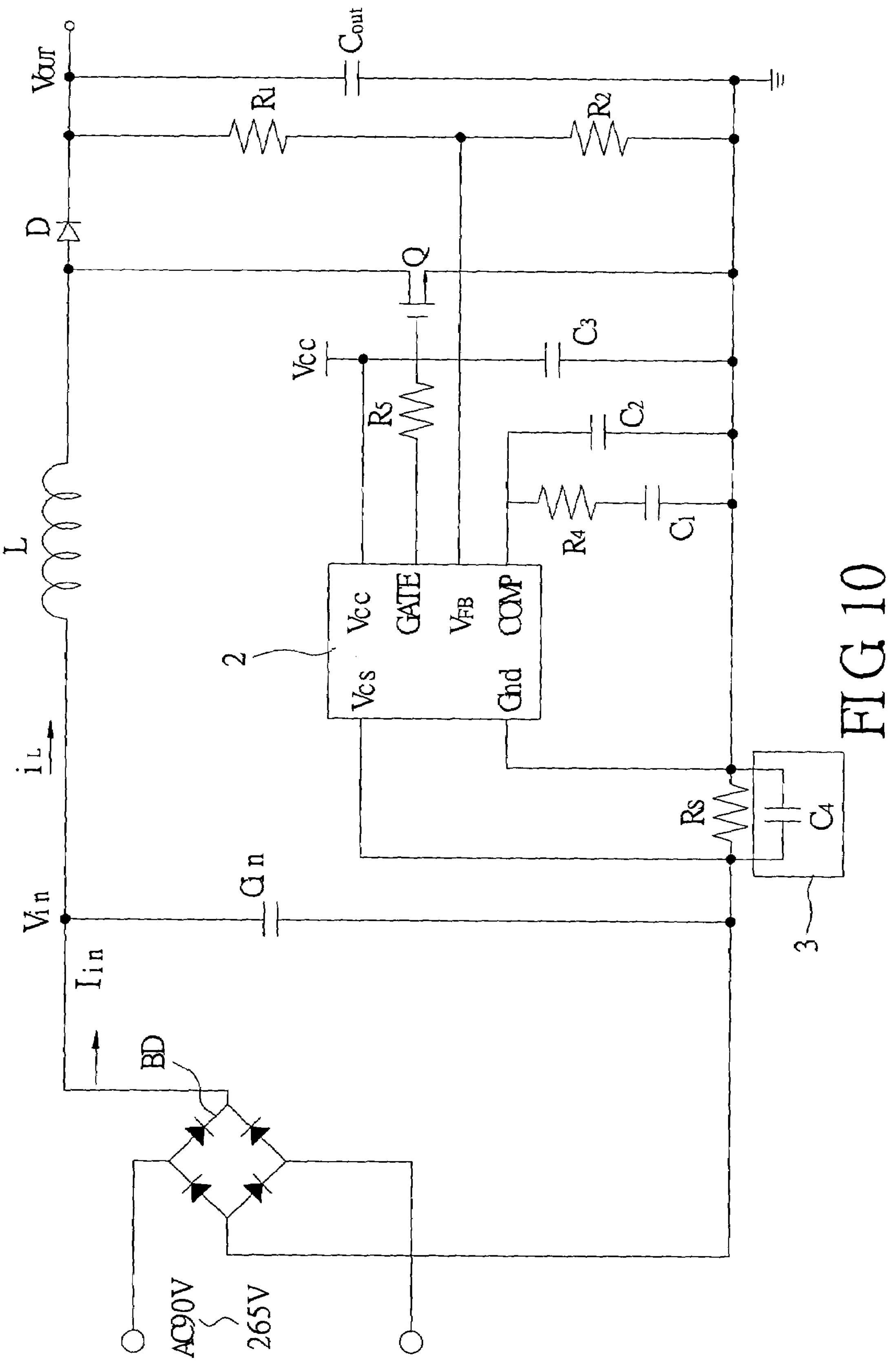
FIG. 10 is a structure diagram of the present invention used in an AC/DC electrical power converter of the second embodiment.

FIG. 10 shows a structure diagram of the present invention used in an AC/DC electrical power converter of the second embodiment. The AC/DC electrical power converter of the second embodiment further comprises a capacitor 3 that is connected with a detection resistor Rs in parallel. The capacitor 3 has a high capacitance. The capacitance of the capacitor 3 is larger than 10 μF to reduce the THD. The capacitor 3 having a low equivalent series resistor (Low ESR) has a better performance. Therefore, the noise produced by the switch operating in high frequency is eliminated. A lower corner frequency is obtained (the corner frequency is about ½ switching frequency).

In the AC/DC electrical power converter of the second embodiment, the CCM boost voltage power factor correction apparatus 2 with a current-averaging control mode of the present invention controls the cycle switch operation of a switch Q and makes the input current Iin follow the input voltage Vin rectified by a rectification element BD. Therefore, the input current Iin and the input voltage Vin in the AC/DC electrical power converter have a proportion relation and their phases are the same as each other. The apparatus of the present invention has a high power factor and a low total harmonic distortion (THD).

Figure 11:
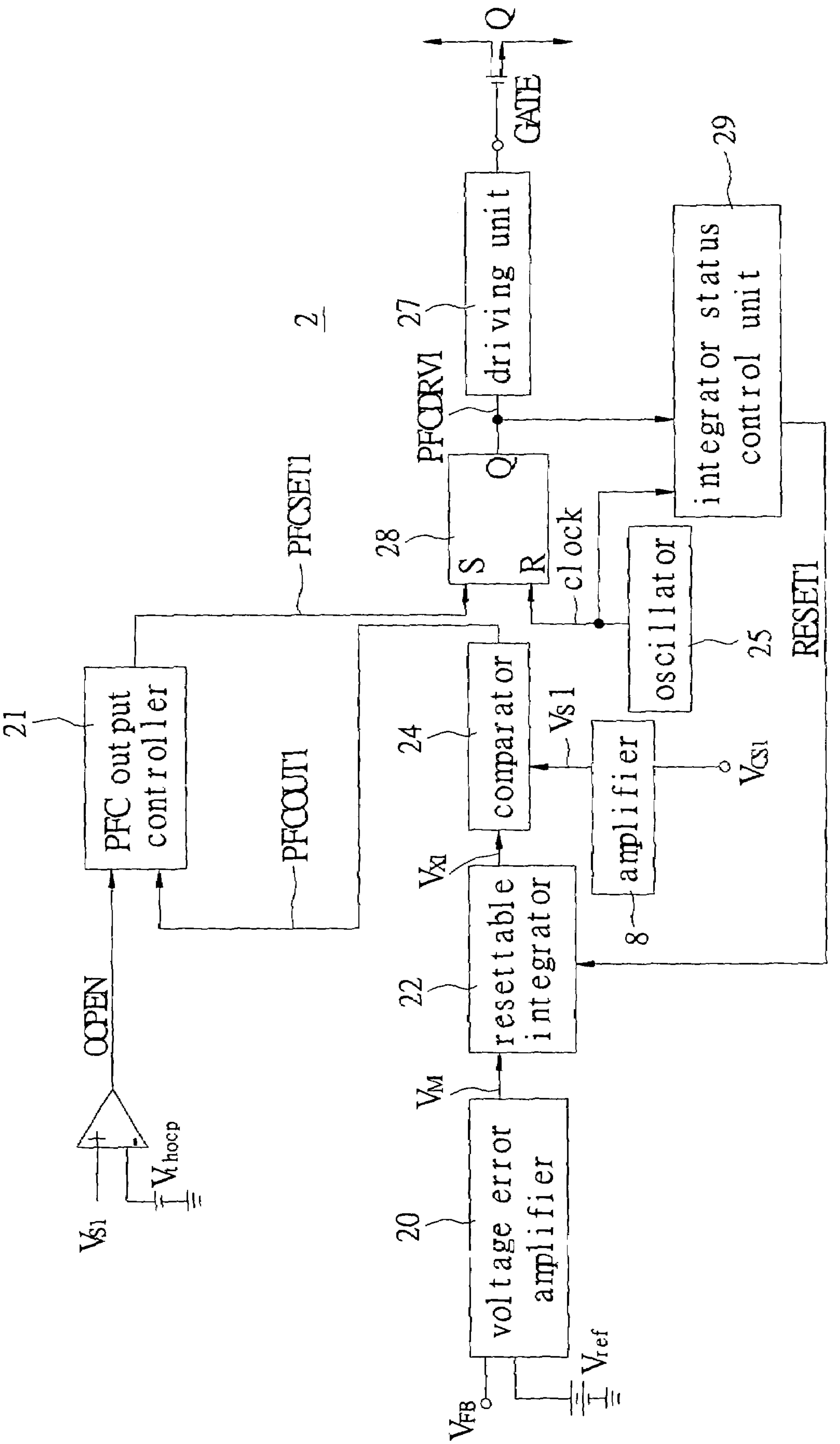
FIG. 11 is a circuit block diagram of the third embodiment of the present invention.

Please refer to FIGS. 10 and 11. FIG. 11 shows a circuit block diagram of the third embodiment of the present invention. The CCM boost voltage power factor correction apparatus 2 with a current-averaging control mode of the present invention is used for an AC/DC electrical power converter. The CCM boost voltage power factor correction apparatus 2 with a current-averaging control mode uses a cycle signal clock outputted from a oscillator 25 to control a switch Q to trim the input current Iin of the AC/DC electrical power converter and make the input current Iin have a sine waveform and its phase be the same as the input voltage Vin. The power factor correction apparatus 2 uses a voltage error amplifier 20 connected with the output port of the AC/DC electrical power converter to obtain a voltage feedback signal $V_{FB}$ via a dividing resistor R2. The voltage error amplifier 20 compares the voltage feedback signal $V_{FB}$ with a reference voltage Vref to output a difference voltage signal $V_{M1}$.

A resettable integrator 22 connects with the voltage error amplifier 20 for integrating the difference voltage signal $V_{M1}$ to output an integration output signal Vx1. The slope of the integration output signal Vx1 is determined by the magnitude of the difference voltage signal $V_{M1}$. A comparator 24 that connects with the resettable integrator 22 compares the integration output signal Vx1 with the input current signal $V_{S1}$ that is detected by a detection resistor Rs and is amplified by an amplifier 8 to output a power factor amended signal PFCOUT1. The power factor amended signal PFCOUT1 is transmitted to a PFC output controller 21 that is connected with the comparator 24. The PFC output controller 21 outputs a PFC setting signal PFCSET1 to a set port S of a flipflop 28. The period of the PFC setting signal PFCSET1 is about several 10 ns and the PFC setting signal PFCSET1 is used for setting a control signal PFCDRV1 outputted from the flipflop 18 to control the switch Q to turn on in time. A driving unit 27 is connected with the flipflop 28 and the switch Q for amplifying the control signal PFCDRV1 to drive the switch Q.

The flipflop 28 that is connected with the PFC output controller 21 and the oscillator 25 is used for receiving the setting signal PFCSET1 and outputs the control signal PFCDRV1 to control the switch Q in time according to the cycle signal clock outputted from the oscillator 25. In the CCM boost voltage power factor correction apparatus 2 with a current-averaging control mode of the present invention, the integration output signal Vx1 of the resettable integrator 22 is the variation average value of the voltage feedback signal $V_{FB}$ and the reference voltage Vref. When the integration output signal Vx1 is larger than the input current signal $V_{S1}$, the power factor amended signal PFCOUT1 outputted from the comparator 24 sets the control signal PFCDRV1 outputted from the flipflop 28 to make the switch Q turn on. By using this control method, the input port of the AC/DC electrical power converter has a resistance. Thereby, the input current Iin is a sine wave, and the input current Iin and the input voltage Vin have a proportion relation and their phases are the same as each other. The apparatus 2 of the present invention has a high power factor and a low total harmonic distortion (THD).

Figure 12:
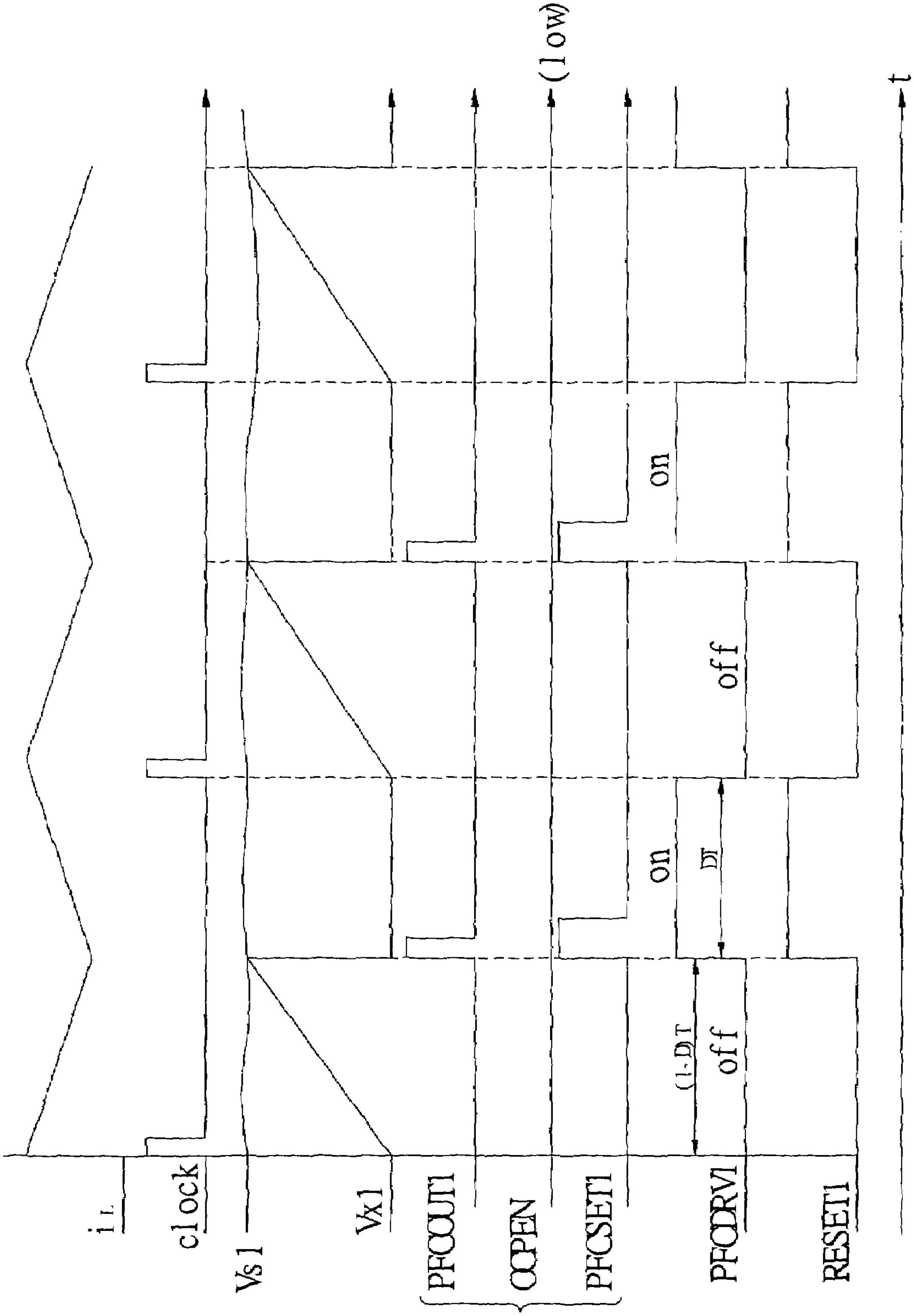
FIG. 12 is a schematic diagram of waveforms of the circuit of the third embodiment of the present invention in FIG. 11.

Please refer to FIGS. 11 and 12. FIG. 12 shows a schematic diagram of waveforms of the circuit of the third embodiment of the present invention. The control signal PFCDRV1 outputted from the flipflop 28 is controlled by the result of the comparator 24. When the integration output signal Vx1 is larger than the input current signal $V_{S1}$, the power factor amended signal PFCOUT1 outputted from the comparator 24 sets the control signal PFCDRV1 outputted from the flipflop 28 via the PFC output controller 21 to make the switch Q turn on. Until the oscillator 25 outputs a next cycle clock, the switch Q turns off again to form a leading edge.

At the same time, the integrator status control unit 29 outputs the reset signal RESET1 to the resettable integrator 22 for resetting the integration output signal Vx1. By using this control method, the current $i_L$ flowing through the inductor L is on a continuous conduction mode. Thereby, the input port of the AC/DC electrical power converter has a resistance. Therefore, the input current Iin is a sine wave, and the input current Iin and the input voltage Vin have a proportion relation and their phases are the same as each other.

That the input current Iin and the input voltage Vin have a proportion relation and their phases are same as each other can be proved by the following formulas (3):

$$V_{S1} = V_{X1}$$

$$i_{av} R_S G = \frac{1}{\tau}\int_0^{(1-D)T} V_M \, dt$$

$$\text{let } \tau \cong T$$

$$i_{av} R_S G = V_M (1-D) = V_M \frac{V_{in}}{V_O}$$

$$i_{av} \propto V_{in}$$

In the formulas (3), Vin is the input voltage; Vo is the output voltage; $i_{av}$ is the average input current; T is the cycle; $V_M$ is the difference voltage signal; D is the duty cycle; Rs is the detection resistor; G is the current sensor gain; τ is the time constant of the integrator.

Figure 13:
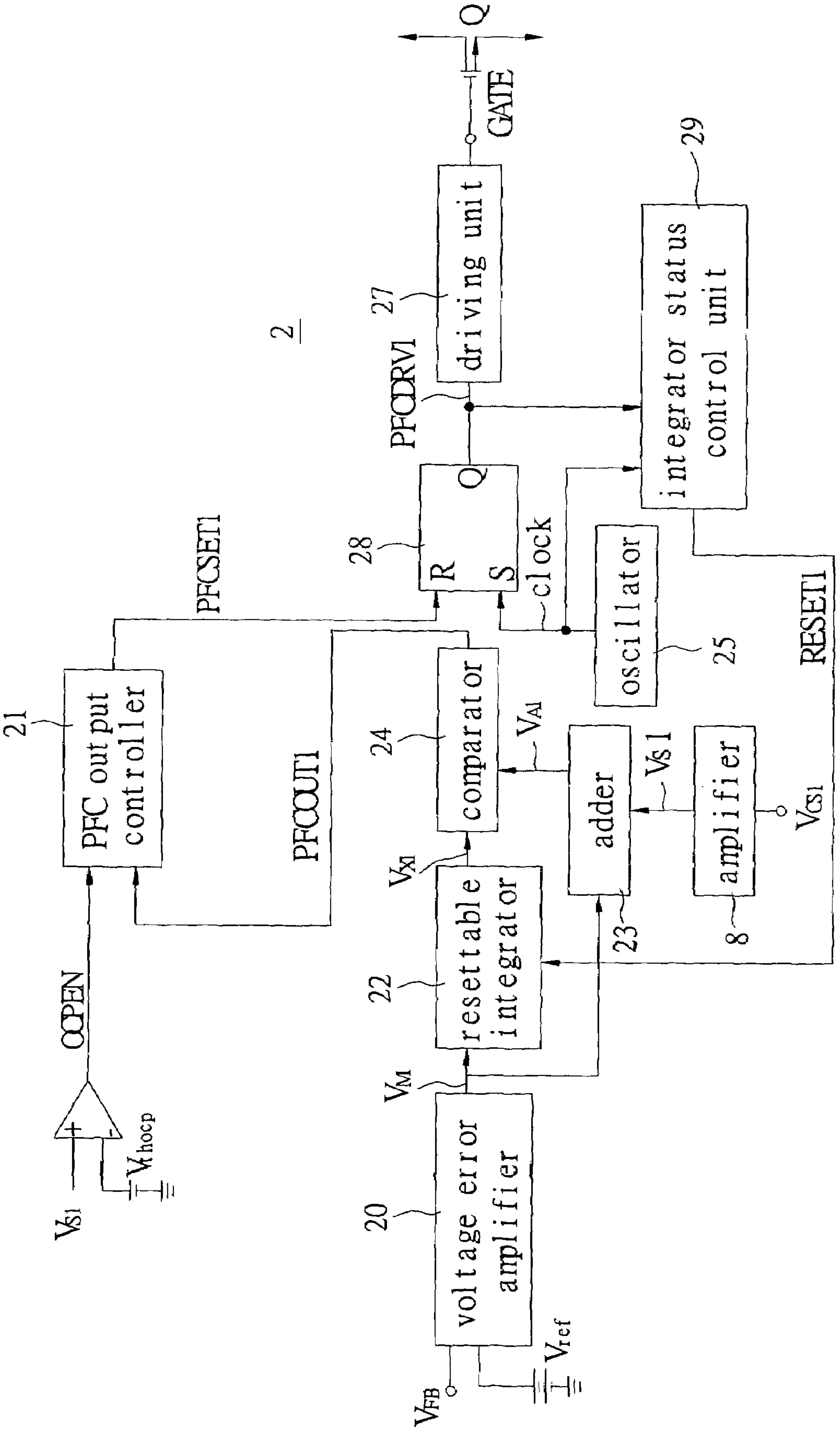
FIG. 13 is a circuit block diagram of the fourth embodiment of the present invention.

Please refer to FIGS. 10 and 13. FIG. 13 shows a circuit block diagram of the fourth embodiment of the present invention. The CCM boost voltage power factor correction apparatus 2 with a current-averaging control mode of the present invention further comprises an adder 23. The adder 23 connects with the voltage error amplifier 20 and the comparator 24. The input current signal $V_{CS1}$ of the AC/DC electrical power converter is obtained via a detection resistor Rs and the amplified input current signal $V_{S1}$ is obtained by an amplifier 8. The adder 23 adds the difference voltage signal $V_{M1}$ with the input current signal $V_{S1}$ to output an integrated signal $V_{A1}$. Next, the integrated signal $V_{A1}$ is transmitted to the comparator 24. The comparator 24 connects with the adder 23 and the resettable integrator 22. The comparator 24 compares the integration output signal $V_{X1}$ with the integrated signal $V_{A1}$ to output a power factor amended signal PFCOUT1.

The power factor amended signal PFCOUT1 is transmitted to a PFC output controller 21 that is connected with the comparator 24. The PFC output controller 21 outputs a PFC resetting signal PFCRESET1 to a reset port R of a flipflop 28. The period of the PFC resetting signal PFCRESET1 is about several 10 ns and the PFC resetting signal PFCRESET1 is used for resetting the control signal PFCDRV1 output from the flipflop 28 to control the switch Q to turn off in time. The driving unit 27 connects with the flipflop 28 and the switch Q for amplifying the control signal PFCDRV1 to drive the switch Q. The flipflop 28 that is connected with the PFC output controller 21 and the oscillator 25 are used for receiving the resetting signal PFCRESET1 and outputting the control signal PFCDRV1 to control the switch Q in time according to the cycle signal clock outputted from the oscillator 25.

In the CCM boost voltage power factor correction apparatus 2 (FIG. 10) with a current-averaging control mode of the present invention, the integration output signal $V_{X1}$ of the resettable integrator 22 is the variation average value of the voltage feedback signal $V_{FB}$ and the reference voltage Vref. When the integration output signal $V_{X1}$ is larger than the integrated signal $V_{A1}$, the power factor amended signal PFCOUT1 outputted from the comparator 24 resets the control signal PFCDRV1 outputted from the flipflop 28 to make the switch Q turn off. By using this control method, the input port of the AC/DC electrical power converter has a resistance. Thereby, the input current Iin is a sine wave, and the input current Iin and the input voltage Vin have a proportion relation and their phases are the same as each other. The apparatus 2 of the present invention has a high power factor and a low total harmonic distortion (THD).

Figure 14:
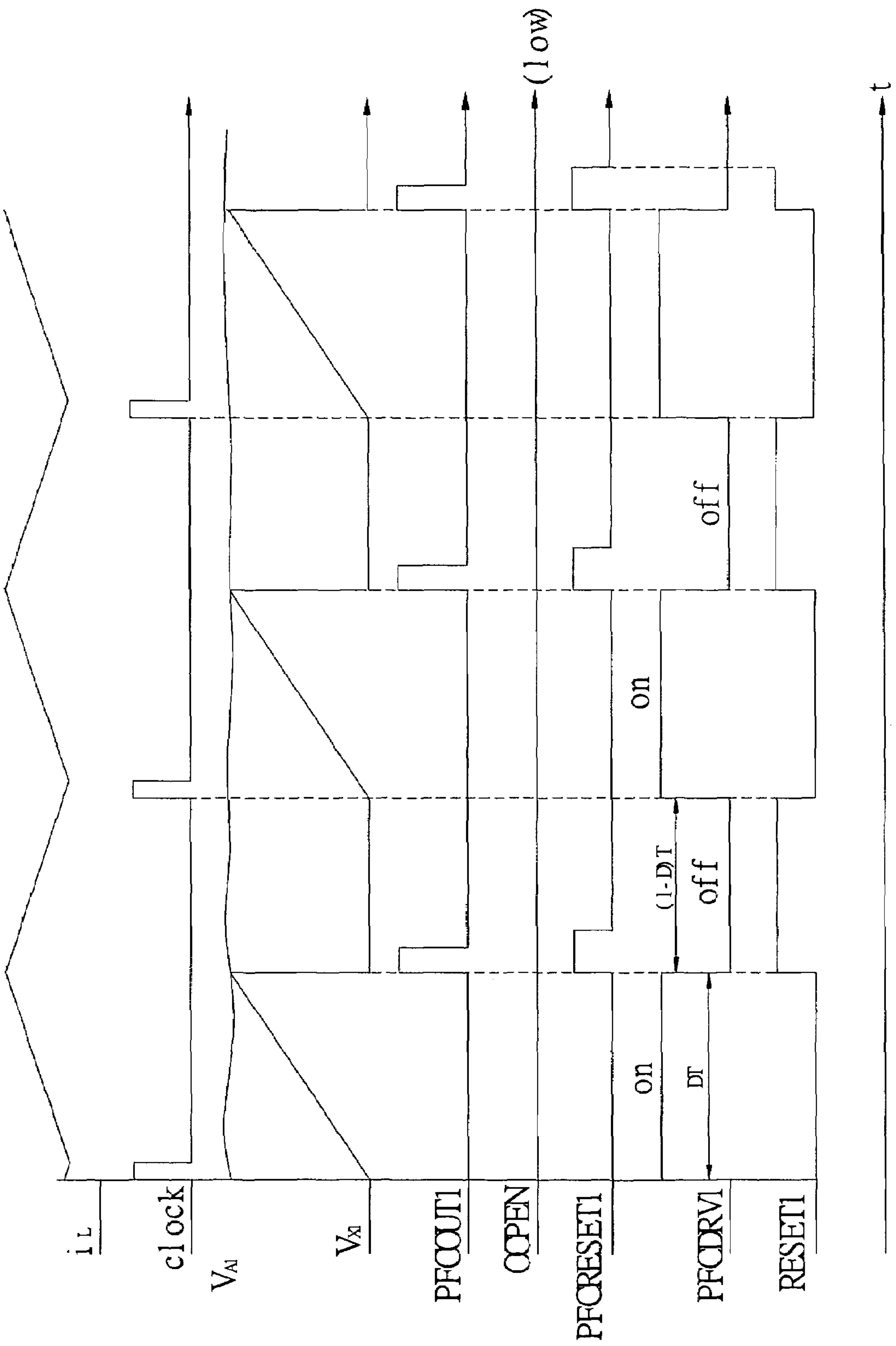
FIG. 14 is a schematic diagram of waveforms of the circuit of the fourth embodiment of the present invention in FIG. 13.

Please refer to FIGS. 13 and 14. FIG. 14 shows a schematic diagram of waveforms of the circuit of the fourth embodiment of the present invention. The control signal PFCDRV1 outputted from the flipflop 28 is controlled by the result of the comparator 24. When the integration output signal $V_{X1}$ is larger than the integrated signal $V_{A1}$, the power factor amended signal PFCOUT1 outputted from the comparator 24 resets the control signal PFCDRV1 outputted from the flipflop 28 via the PFC output controller 21 to make the switch Q turn off. Until the oscillator 25 outputs a next cycle clock, the switch Q turns on status again to form a trailing edge.

At the same time, the integrator status control unit 29 outputs the first reset signal RESET1 to the resettable integrator 22 for resetting the integration output signal $V_{X1}$. By using this control method, the current $i_L$ flowing through the inductor L is in the continuous conduction mode. Thereby, the input port of the AC/DC electrical power converter has a resistance. So, the input current Iin is a sine wave, and the input current Iin and the input voltage Vin have a proportion relation and their phases are the same as each other.

That the input current Iin and the input voltage Vin have a proportion relation and their phases are the same as each other can be proved by the following formulas (4):

$$V_X = V_M - V_{S1}$$

$$\frac{1}{\tau}\int_0^{DT} V_M\,dt = V_M - i_{av}R_S G$$

-continued $$\text{let } \tau = t$$

$$V_M D = V_M - i_{av}R_S G$$

$$i_{av}R_S G = V_M(1-D) = V_M\frac{V_{in}}{V_O}$$

$$i_{av} \propto V_{in}$$

In the formulas (4), Vin is the input voltage; Vo is the output voltage; $i_{av}$ is the average input current; T is the cycle; $V_M$ is the difference voltage signal; D is the duty cycle; Rs is the detection resistor; G is the current sensor gain; and τ is the time constant of the integrator.

The CCM boost voltage power factor correction apparatus with a current-averaging control mode of the present invention is used for an AC/DC electrical power converter. The apparatus uses an integrator to individually integrate the difference voltage signal obtained from comparison and the input current signal obtained from detection. The integration result is then compared to control the duty cycle of the switch. Thereby, the input current and the input voltage in the AC/DC electrical power converter have a proportion relation and their phases are the same as each other. The components used in this control method are simpler than the PFC circuit of the prior art. It is easy to integrate in one chip with fewer pins. The apparatus of the present invention has a high power factor and a low total harmonic distortion (THD).

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A continuous conduction mode (CCM) boost voltage power factor correction (PFC) apparatus with a current-averaging control mode, that is used for an AC/DC electrical power converter, using a cycle signal outputted from an oscillator to control a switch to trim the input current of the AC/DC electrical power converter and make the input current have a sine waveform and its phase be the same as the input voltage, comprising:

a voltage error amplifier, connected with the output port of the AC/DC electrical power converter, for obtaining a voltage feedback signal, the voltage feedback signal is compared with a reference voltage to output a difference voltage signal;

a first resettable integrator, connected with the voltage error amplifier, for integrating the difference voltage signal to output a first output signal;

a second resettable integrator, obtaining an amplified input current signal via a detection resistor and an amplifier and integrating the amplified input current signal to output a second output signal;

a comparator, connected with the first resettable integrator and the second resettable integrator, for comparing the first output signal with the second output signal to output a power factor amended signal;

a flipflop, a reset port of the flipflop connects with the oscillator and a set port of the flipflop connects with the comparator via a PFC output controller, for receiving a PFC setting signal outputted from the PFC output controller, the flipflop outputs a control signal to control the switch in time according to an output cycle signal outputted from the oscillator; and an integrator status control unit, connected with the oscillator, the flipflop, the first resettable integrator and the second resettable integrator, for receiving the control signal to individually output a first reset signal and a second reset signal to the first resettable integrator and the second resettable integrator, the integrator status control unit resets the first output signal and the second output signal by using a leading edge method.

2. The CCM boost voltage power factor correction apparatus with a current-averaging control mode of claim 1, wherein the slope of the first output signal is determined by the magnitude of the difference voltage signal.

3. The CCM boost voltage power factor correction apparatus with a current-averaging control mode of claim 1, wherein the slope of the second output signal is determined by the magnitude of the amplified input current signal.

4. The CCM boost voltage power factor correction apparatus with a current-averaging control mode of claim 1, further comprising a driving unit, connected with the flipflop and the switch, for amplifying the control signal to drive the switch.

5. A continuous conduction mode (CCM) boost voltage power factor correction (PFC) apparatus with a current-averaging control mode, that is used for an AC/DC electrical power converter, using a cycle signal outputted from an oscillator to control a switch to trim the input current of the AC/DC electrical power converter and make the input current have a sine waveform and a phase be the same as that of the input voltage, comprising:

a voltage error amplifier, connected with the output port of the AC/DC electrical power converter, for obtaining a voltage feedback signal, the voltage feedback signal is compared with a reference voltage to output a difference voltage signal;

a first resettable integrator, connected with the voltage error amplifier, for integrating the difference voltage signal to output a first output signal;

a second resettable integrator, obtaining an amplified input current signal via a detection resistor and an amplifier and integrating the amplified input current signal to output a second output signal;

an adder, connected with the first resettable integrator and the second resettable integrator, for adding the first output signal and the second output signal to output an integrated signal;

a comparator, connected with the adder and the voltage error amplifier, for comparing the difference voltage signal with the integrated signal to output a power factor amended signal;

a flipflop, a set port of the flipflop connects with the oscillator and a reset port of the flipflop connects with the comparator via a PFC output controller, for receiving a PFC resetting signal outputted from the PFC output controller, the flipflop outputs a control signal to control the switch in time according to an output cycle signal outputted from the oscillator; and an integrator status control unit, connected with the oscillator, the flipflop, the first resettable integrator and the second resettable integrator, for receiving the control signal to individually output a first reset signal and a second reset signal to the first resettable integrator and the second resettable integrator, the integrator status control unit resets the first output signal and the second output signal by using a trailing edge method.

6. The CCM boost voltage power factor correction apparatus with a current-averaging control mode of claim 5, wherein the slope of the first output signal is determined by the magnitude of the difference voltage signal.

7. The CCM boost voltage power factor correction apparatus with a current-averaging control mode of claim 5, wherein the slope of the second output signal is determined by the magnitude of the amplified input current signal.

8. The CCM boost voltage power factor correction apparatus with a current-averaging control mode of claim 5, further comprising a driving unit, connected with the flipflop and the switch, for amplifying the control signal to drive the switch.

9. A continuous conduction mode (CCM) boost voltage power factor correction (PFC) apparatus with a current-averaging control mode, that is used for an AC/DC electrical power converter, using a cycle signal outputted from an oscillator to control a switch to trim the input current of the AC/DC electrical power converter and make the input current have a sine waveform and its phase be the same as the input voltage, comprising:

a voltage error amplifier, connected with the output port of the AC/DC electrical power converter, for obtaining a voltage feedback signal, the voltage feedback signal is compared with a reference voltage to output a difference voltage signal;

a resettable integrator, connected with the voltage error amplifier, for integrating the difference voltage signal to output an integration output signal;

a comparator, connected with the resettable integrator, for receiving the integration output signal and obtaining an amplified input current signal via a detection resistor and an amplifier, the comparator compares the integration output signal with the amplified input current signal to output a power factor amended signal;

a capacitor, connected with the detection resistor in parallel;

a flipflop, a reset port of the flipflop connects with the oscillator and a set port of the flipflop connects with the comparator via a PFC output controller, for receiving a PFC setting signal outputted from the PFC output controller, the flipflop outputs a control signal to control the switch in time according to an output cycle signal outputted from the oscillator; and an integrator status control unit, connected with the oscillator, the flipflop and the resettable integrator, for receiving the control signal and the output cycle signal to output a reset signal to the resettable integrator, the integrator status control unit resets the integration output signal by using a leading edge method.

10. The CCM boost voltage power factor correction apparatus with a current-averaging control mode of claim 9, wherein the slope of the integration output signal is determined by the magnitude of the difference voltage signal.

11. The CCM boost voltage power factor correction apparatus with a current-averaging control mode of claim 9, further comprising a driving unit, connected with the flipflop and the switch, for amplifying the control signal to drive the switch.

12. A continuous conduction mode boost voltage power factor correction (PFC) apparatus with a current-averaging control mode, that is used for an AC/DC electrical power converter, using a cycle signal outputted from an oscillator to control a switch to trim the input current of the AC/DC electrical power converter and make the input current have a sine waveform and its phase be the same as the input voltage, comprising:

a voltage error amplifier, connected with the output port of the AC/DC electrical power converter, for obtaining a voltage feedback signal, the voltage feedback signal is compared with a reference voltage to output a difference voltage signal;

a resettable integrator, connected with the voltage error amplifier, for integrating the difference voltage signal to output an integration output signal;

an adder, connected with the voltage error amplifier, for receiving the difference voltage signal and obtaining an amplified input current signal via a detection resistor and an amplifier, the adder adds the difference voltage signal and the input current signal to output an integrated signal;

a capacitor, connected with the detection resistor in parallel;

a comparator, connected with the resettable integrator and the adder, for comparing the integration output signal with the integrated signal to output a power factor amended signal;

a flipflop, a set port of the flipflop connects with the oscillator and a reset port of the flipflop connects with the comparator via a PFC output controller, for receiving a PFC resetting signal outputted from the PFC output controller, the flipflop outputs a control signal to control the switch in time according to an output cycle signal outputted from the oscillator; and an integrator status control unit, connected with the oscillator, the flipflop and the resettable integrator, for receiving the control signal and the output cycle signal to output a reset signal to the resettable integrator, the integrator status control unit resets the integration output signal by using a trailing edge method.

13. The CCM boost voltage power factor correction apparatus with a current-averaging control mode of claim 12, wherein the slope of the integration output signal is determined by the magnitude of the difference voltage signal.

14. The CCM boost voltage power factor correction apparatus with a current-averaging control mode of claim 12, further comprising a driving unit, connected with the flipflop and the switch, for amplifying the control signal to drive the switch.

15. A method used for a continuous conduction mode boost voltage power factor correction with a current-averaging control mode, the steps comprising:

comparing a voltage feedback signal with a reference signal to produce a difference voltage signal;

integrating the difference voltage signal to output a first output signal;

amplifying and integrating an input current signal to output a second output signal;

comparing the first output signal with the second output signal to output a power factor amended signal;

switching the switch in time according to the power factor amended signal; and resetting individually the first output signal and the second output signal according to the power factor amended signal.

16. A method used for a continuous conduction mode (CCM) boost voltage power factor correction with a current-averaging control mode, the steps comprising:

comparing a voltage feedback signal with a reference signal to produce a difference voltage signal;

integrating the difference voltage signal to output a first output signal;

amplifying an input current signal;

comparing the first output signal with the amplified input current signal to output a power factor amended signal;

switching the switch in time according to the power factor amended signal; and resetting the first output signal according to the power factor amended signal.

17. The method used for a CCM boost voltage power factor correction with a current-averaging control mode of claim 15 or 16, wherein the step of resetting individually the first output signal and the second output signal according to the power factor amended signal is implemented by a leading edge method.

18. A method used for a continuous conduction mode (CCM) boost voltage power factor correction with a current-averaging control mode, the steps comprising:

comparing a voltage feedback signal with a reference signal to produce a difference voltage signal;

integrating the difference voltage signal to output a first output signal;

amplifying and integrating an input current signal to output a second output signal;

adding the first output signal with the second output signal to output an integrated signal;

comparing the integrated signal with the difference voltage signal to output a power factor amended signal;

switching the switch in time according to the power factor amended signal; and resetting individually the first output signal and the second output signal according to the power factor amended signal.

19. A method used for a continuous conduction mode (CCM) boost voltage power factor correction with a current-averaging control mode, the steps comprising:

comparing a voltage feedback signal with a reference signal to produce a difference voltage signal;

integrating the difference voltage signal to output a first output signal;

amplifying an input current signal;

adding the first output signal with the amplified input current signal to output an integrated signal;

comparing the integrated signal with the difference voltage signal to output a power factor amended signal;

switching the switch in time according to the power factor amended signal; and resetting the first output signal according to the power factor amended signal.

20. The method used for a CCM boost voltage power factor correction with a current-averaging control mode of claim 18 or 19, wherein the step of individually resetting the first output signal and the second output signal according to the power factor amended signal is implemented by a trailing edge method.

* * * * *